(12) United States Patent
Liu

(10) Patent No.: US 11,738,816 B2
(45) Date of Patent: Aug. 29, 2023

(54) LOCK

(71) Applicant: TEAM YOUNG TECHNOLOGY CO., LTD., Taoyuan (TW)

(72) Inventor: Chih-Hung Liu, Taoyuan (TW)

(73) Assignee: TEAM YOUNG TECHNOLOGY CO., LTD., Taoyuan (TW)

( * ) Notice: Subject to any disclaimer, the term of this patent is extended or adjusted under 35 U.S.C. 154(b) by 307 days.

(21) Appl. No.: 17/355,214

(22) Filed: Jun. 23, 2021

(65) Prior Publication Data

US 2022/0017169 A1    Jan. 20, 2022

(30) Foreign Application Priority Data

Jul. 16, 2020    (TW) .................................. 109124129

(51) Int. Cl.

| E05B 71/00 | (2006.01) |
| B62H 5/02 | (2006.01) |
| B62H 5/00 | (2006.01) |
| E05B 73/00 | (2006.01) |
| E05B 47/00 | (2006.01) |

(52) U.S. Cl.
CPC .............. *B62H 5/003* (2013.01); *B62H 5/02* (2013.01); *E05B 71/00* (2013.01); *E05B 73/0011* (2013.01); *E05B 47/0009* (2013.01)

(58) Field of Classification Search
CPC .. E05B 71/00; E05B 73/0005; E05B 73/0011; E05B 47/0009; B62H 5/003; B62H 5/02; B62H 5/06

See application file for complete search history.

(56) References Cited

U.S. PATENT DOCUMENTS

| 2,032,821 A | * | 3/1936 | Waits | ........................ | B62H 5/06 |
| | | | | | 70/185 |
| 4,055,060 A | * | 10/1977 | Bellino | ................... | B62H 5/003 |
| | | | | | 70/238 |
| 4,232,537 A | * | 11/1980 | Plaiss | ..................... | B62H 5/003 |
| | | | | | 70/238 |
| 5,836,002 A | * | 11/1998 | Morstein | ................ | B62H 5/003 |
| | | | | | 340/432 |
| 6,076,381 A | * | 6/2000 | Green | ...................... | B62H 5/06 |
| | | | | | 70/186 |

(Continued)

FOREIGN PATENT DOCUMENTS

| CN | 205059802 | 3/2016 |
| EP | 3197763 | 9/2019 |

(Continued)

*Primary Examiner* — Christopher J Boswell
(74) *Attorney, Agent, or Firm* — JCIPRNET

(57) ABSTRACT

A lock for locking a bike is provided. To lock the bike, a user inserts a rope head into a lock through a lock hole. The rope head drives a slider in the lock, and the slider drives a pin, causing an upper-rotation shaft of the lock become not linked to move with a lower-rotation shaft of the lock. Since the upper-rotation shaft and the lower-rotation shaft of the lock are respectively connected to a handlebar and a front wheel of the bike, the user is unable to control the front wheel through the handlebar. The rope head may also be connected to a rope, and when locking the lock, the user pulls the rope out from the lock, wraps the rope around a fixed object, and then inserts the rope head into the lock through the lock hole.

12 Claims, 9 Drawing Sheets

(56) References Cited

U.S. PATENT DOCUMENTS

| | | | | |
|---|---|---|---|---|
| 8,099,986 B2* | 1/2012 | Takeuchi | ............... | B62H 5/02 |
| | | | | 70/252 |
| 8,132,437 B1* | 3/2012 | Chen | ............... | B62H 5/003 |
| | | | | 70/30 |
| 9,102,376 B1* | 8/2015 | Chang | ............... | B62H 5/003 |
| 10,472,011 B2* | 11/2019 | Wu | ............... | B62H 5/06 |
| 11,066,117 B2* | 7/2021 | Hu | ............... | B62H 5/003 |
| 2021/0394849 A1* | 12/2021 | Liu | ............... | B62H 5/06 |

FOREIGN PATENT DOCUMENTS

| | | |
|---|---|---|
| TW | M305157 | 1/2007 |
| TW | I458656 | 11/2014 |
| TW | I535612 | 6/2016 |
| TW | I672237 | 9/2019 |
| WO | 2016198340 | 12/2016 |

\* cited by examiner

LOCK

CROSS-REFERENCE TO RELATED APPLICATION

This application claims the priority benefit of Taiwan application serial no. 109124129, filed on Jul. 16, 2020. The entirety of the above-mentioned patent application is hereby incorporated by reference herein and made a part of this specification.

BACKGROUND

Technical Field

The invention relates to a lock system and an installation method thereof, and particularly relates to a lock with a plurality of protection mechanisms.

Description of Related Art

Rope lock is one of the existing, conventional bike locks. The principle of the rope lock is to use a rope to connect and fix a bike with an external fixed object to prevent theft. However, a thief could still cut the rope with a portable, small hydraulic shear, and ride the bike away.

There is a lock that remains locked even after the rope is cut for resolving the above problem. Such lock includes three main components: a lock body, a rope, and a rope head. One end of the rope is fixed on the body of the lock, and the other end is connected with the rope head. When there is a need for locking, a user winds the rope around a rear wheel, and inserts and locks the rope head into the lock body. When the rope head is inserted into the lock body along a horizontal direction, the rope head may drive a lock tongue in the lock body to overcome a return force of a return spring and enter a central shaft downward to prevent a crank from rotating.

Based on such design, even if the thief cuts the steel rope, since a head portion of the steel rope is still in the lock body, a lock pin still remains in the central shaft to prevent the crank from rotating, so that an anti-theft mechanism cannot be successfully removed by only cutting the steel rope. However, such design has several shortcomings. First, the lock requires destructive modification of the bike before it may be installed and used; second, when the thief pulls the rope head out of the lock body by force, the return spring may automatically push the lock pin out of the central shaft, and the locking state is automatically released; third, when the thief cuts the steel rope, and rides the bike by force while the crank is locked, it may cause deformation and damage of the crank.

On the other hand, most of the commercially available electronic locks use internal batteries to power electrical machinery, such as motors, etc., for unlocking the lock. However, when the bike is parked or ridden in a bad environment, the battery in the electronic lock may be damaged by moisture, and the leaked battery liquid may cause corrosion or rust of the bike body. Also, when the electronic lock has no power, the battery must be replaced, which is very inconvenient for the user.

SUMMARY

In view of the shortcomings of the above-mentioned existing rope lock and electronic lock, one of the objectives of the invention is to provide a lock that uses an upper-rotation shaft to connect a handlebar via a faucet, and uses a lower-rotation shaft to connect a front wheel via a front fork tube, which is simple and may be used without destructive modification of a bike. In addition, the lock of the invention adopts a design of separating a rope head and a slider, so that when the rope head is forcibly pulled out in a locking state, the slider is still remained in an original position, and the handlebar and the front wheel are maintained in a non-linked state, and the bike cannot be ridden. In addition, since a design of releasing movement linkage is adopted, damage of components due to forcible riding in the prior art is avoided. Moreover, in an embodiment of the invention, the lock does not consume power during a locking process, and the power used during an unlocking process is directly provided by an external unlocking device, i.e., a battery may be omitted in the lock to avoid the problem of battery damage.

To be specific, in an embodiment of the invention, a lock includes a movement transmission component group including a first connecting member and a second connecting member; a slider; a rope head, linked to move with the slider, and configured to trigger a locking motion; a pin, linked to move with the slider, and configured to limit movement of the first connecting member or the second connecting member; a fixing rod, linked to move with the slider, and configured to limit movement of the slider; a lock hook, linked to move with the slider, and configured to limit movement of the rope head; and a first driving component, linked to move with the slider, and configured to push the slider to move; during a locking process of the lock, the following motions are included: the rope head pushes the slider from an unlocking position to a locking position; the lock hook is driven by the slider to hook the rope head to limit movement of the rope head; the slider and the fixing rod are engaged at the locking position to prevent the slider from moving to the unlocking position; and the pin is driven by the slider to separate from at least one of the first connecting member and the second connecting member; during an unlocking process of the lock, the following motions are included: the fixing rod releases the slider so that the first driving component pushes the slider from the locking position to the unlocking position; the lock hook is pushed by the slider to make the lock hook separated from the rope head, so that the rope head is adapted to move; and the pin reconnects at least one of the first connecting member and the second connecting member.

In any one of the locks as described above, the slider and the pin are connected by an inclined interface, and when the slider is moved toward the locking position, the slider drives the pin through the inclined interface to make the pin separate from at least one of the first connecting member and the second connecting member.

In any one of the locks as described above, the lock further includes a second driving component linked to move with the pin, and the second driving component is configured to drive the pin during the unlocking process to connect the pin with at least one of the first connecting member and the second connecting member.

In any one of the locks as described above, the slider is provided with a pin hole, the inclined interface is located in the pin hole, and the pin hole is configured to allow the pin to penetrate through the slider to connect with at least one of the first connecting member and the second connecting member.

In any one of the locks as described above, during the locking process and the unlocking process, the pin moves back and forth along a horizontal direction, and the horizontal direction is perpendicular to a moving direction of the slider.

In any one of the locks as described above, the fixing rod is provided with a rotation shaft and a shifting lever. The rotation shaft is linked to move with the shifting lever. During the locking process, the slider drives the shifting lever to rotate outward along the rotation shaft to allow the slider to pass through; after the slider passes through, the shifting lever automatically rotates inward along the rotation shaft and is engaged with the slider at the locking position to prevent the slider from moving to the unlocking position; during the unlocking process, the shifting lever is rotated outward along the rotation shaft by an external force to release the slider.

In any one of the locks as described above, the lock further includes: a connecting port, configured to connect with an unlocking device; an actuator, linked to move with the shifting lever; a control module, connected to the connecting port and the actuator, configured to perform a verification procedure during the unlocking process to verify the unlocking device, wherein when the unlocking device passes the verification, the control module controls the actuator to apply an external force to the shifting lever, so that the shifting lever is rotated outward along the rotation shaft to release the slider.

In any one of the locks as described above, the lock further includes: a third driving component, which is linked to move with the shifting lever. The third driving component is configured to automatically rotate the shifting lever inward along the rotation shaft and engage the slider at the locking position during the locking process, so as to prevent the slider from moving to the unlocking position; wherein the actuator includes a shape memory alloy wire, which is contracted when a temperature is raised to a reaction temperature range to generate the aforementioned external force applied to the shifting lever, and is configured to pull the shifting lever to make the shifting lever rotate outward along the rotation shaft to release the slider during the unlocking process.

In any one of the locks as described above, the first driving component, the second driving component, and the third driving component are respectively a spring, a leaf spring or an air cylinder.

In any one of the locks as described above, the lock does not include a battery, and electric energy required by the actuator and the control module in the unlocking process is obtained through the connecting port.

In any one of the locks as described above, one of the first connecting member and the second connecting member is an upper-rotation shaft, the other one is a lower-rotation shaft, the first connecting member and the second connecting member are coaxially arranged and respectively have a connecting hole, the connecting holes of the first connecting member and the second connecting member are respectively used for accommodating the pin, when the pin simultaneously penetrate into the connecting holes of the first connecting member and the second connecting member, the first connecting member and the second connecting member are linked to move with each other; and when the pin does not simultaneously penetrate into the connecting hole of the first connecting member and the connecting hole of the second connecting member, the first connecting member and the second connecting member are not linked to move with each other.

In any one of the locks as described above, the lock further includes a rope, wherein one end of the rope is connected with a lock body, and the other end is connected with the rope head, and when the rope head enters the locking position, the rope is adapted to be winded around a fixed object to achieve a locking effect.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "upper," "lower," "left," "right," "front," "back," "top" "bottom," "side," etc., is used with reference to the orientation of the Figure(s) being described and are not intended to be limiting of the invention.

Figure 1A:
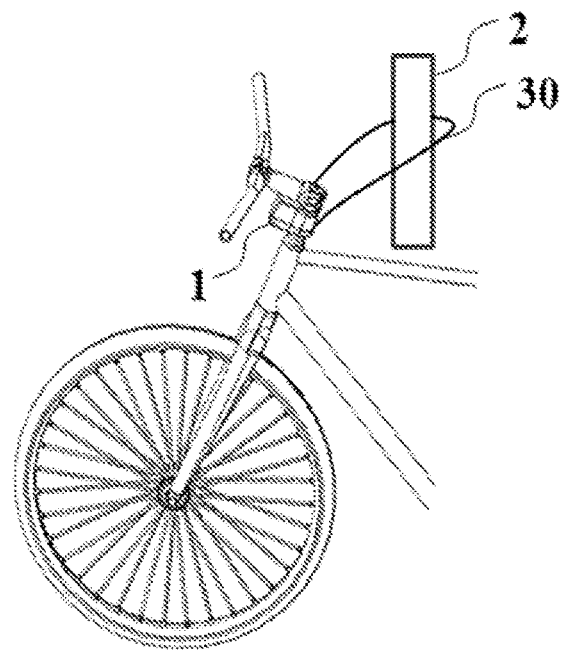
FIG. 1A and FIG. 1B are respectively a schematic diagram of a use situation of a lock applied to a bike and an appearance schematic diagram of the lock according to a first embodiment of the invention.
Figure 1B:
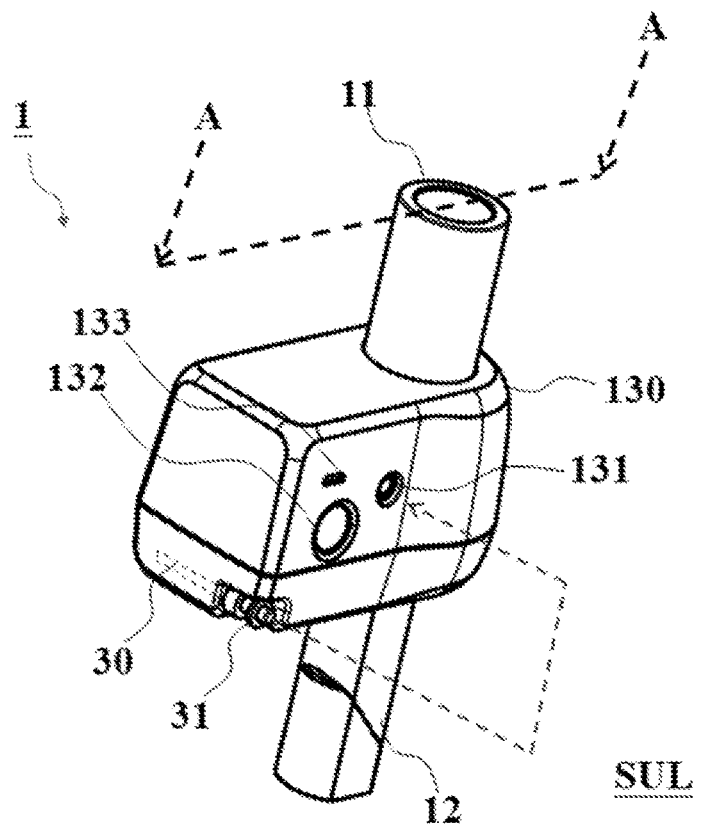

Referring to FIG. 1A and FIG. 1B, FIG. 1A and FIG. 1B are respectively a schematic diagram of a use situation of a lock applied to a bike and an appearance schematic diagram of the lock according to a first embodiment of the invention. From an appearance of a lock 1, it is known that the lock 1 has a lock body wrapped by a housing 130, and a first connecting member 11 and a second connecting member 12 respectively penetrating through upper and lower sides of the housing 130. The housing 130 is provided with a lock hole 131, a retraction button 132, a connecting port 133 and a rope head 31 connected to a rope 30.

A user changes the bike from an unlocking state SUL to a locking state SL through a locking process, and on the contrary, it is an unlocking process. At the beginning of the locking process, the user may solely insert the rope head 31 that is not connected to the rope 30 into the lock hole 131 to trigger a locking motion of the lock 1; or pull the rope head 31 that is connected to the rope 30 out from the housing 130, and after winding the rope 30 around a fixed object 2, the user insert the rope head 31 into the lock 1 through the lock hole 131 to trigger the locking motion of the lock 1; and when the user pushes the rope head 31 to a locking position of the lock 1, the rope head 31 is automatically locked in the lock 1. At the same time, a handlebar and a front wheel of the bike are automatically switched to be non-linked, and the user is unable to control rotation of the front wheel by turning the handlebar, so as to achieve a better anti-theft effect.

When the user needs to unlock the bike, the user may use an unlocking device (not shown) to electrically connect the lock 1 via the connecting port 133. After the connection, the lock 1 may be automatically unlocked, and the rope head 31 may be automatically released from the housing 130. Thereafter, if the rope head 31 is connected to the rope 30, the user may press the retraction button 132, and the lock 1 may automatically retract the rope 30 into the housing 130 and return to the unlocking state SUL. Meanwhile, the handlebar and the front wheel of the bike may automatically return to a linked state, allowing the user to ride normally. The aforementioned unlocking device may be various electronic devices with power and a signal transmission function, such as a remote controller or a mobile phone. In the embodiment, the unlocking device and the lock 1 are connected by a physical connection line; however, if necessary, a wireless module with both power and the signal transmission function may also be used instead, which is not limited by the invention.

A detailed design of the lock of the invention is described below.

Figure 1C:
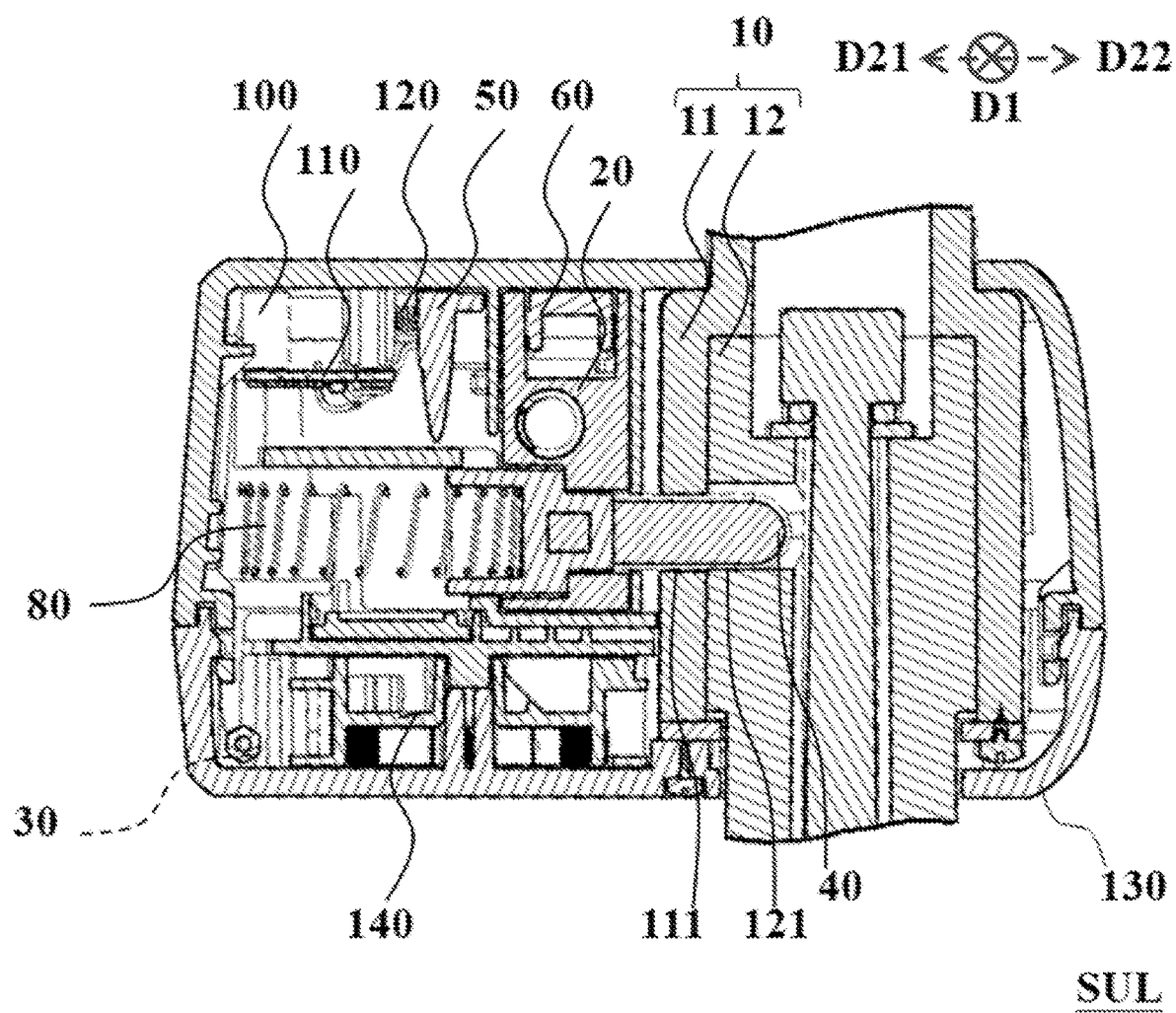
FIG. 1C is a schematic cross-sectional view of the lock in an unlocking state SUL that is viewed along a reference line A-A of FIG. 1B according to the first embodiment of the invention.

Referring to FIG. 1A-FIG. 2C at the same time, FIG. 1C is a schematic cross-sectional view of the lock in the unlocking state SUL that is viewed along a reference line A-A of FIG. 1A according to the first embodiment of the invention. As shown in FIG. 1C and FIG. 2A, in the embodiment, the lock 1 mainly includes a transmission component group 10, a slider 20, the rope 30, a pin 40, a fixing rod 50, a lock hook 60, a first driving component 70, a second driving component 80, an actuator 100, a control module 110, a third driving component 120, the housing 130, and a lock rope turntable 140.

Before explaining a relative relationship of each of the components, a design of each component is described as follows.

The movement transmission component group 10 generally refers to a combination of a plurality of components for transmission. Referring to FIG. 1C, in the embodiment, the movement transmission component group 10 includes the first connecting member 11 and the second connecting member 12. The first connecting member 11 and the second connecting member 12 are respectively hollow tubes, and at least a part of the second connecting member 12 penetrates into the inside of the first connecting member 11 to be coaxially arranged along with the first connecting member 11. Namely, the first connecting member 11 is an outer tube and used as an upper-rotation shaft, and the second connecting member is an inner tube and used as a lower-rotation shaft. The first connecting member 11 and the second connecting member 12 respectively have a first connecting hole 111 and a second connecting hole 121 located at a same height. However, when necessary, the first connecting member 11 may also be adjusted to be the inner tube or the lower-rotation shaft, while the second connecting member 12 is adjusted accordingly, which is not limited by the invention.

Figure 3A:
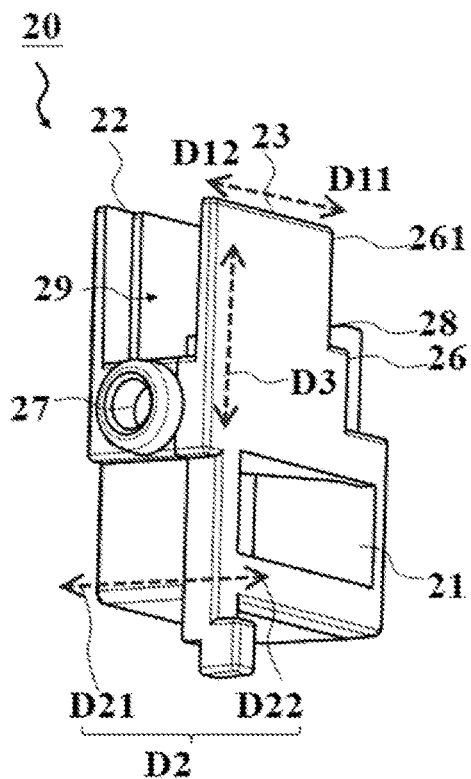
FIG. 3A and FIG. 3B are respectively schematic diagrams of the slider in different viewing angles according to the first embodiment of the lock of the invention.
Figure 3B:
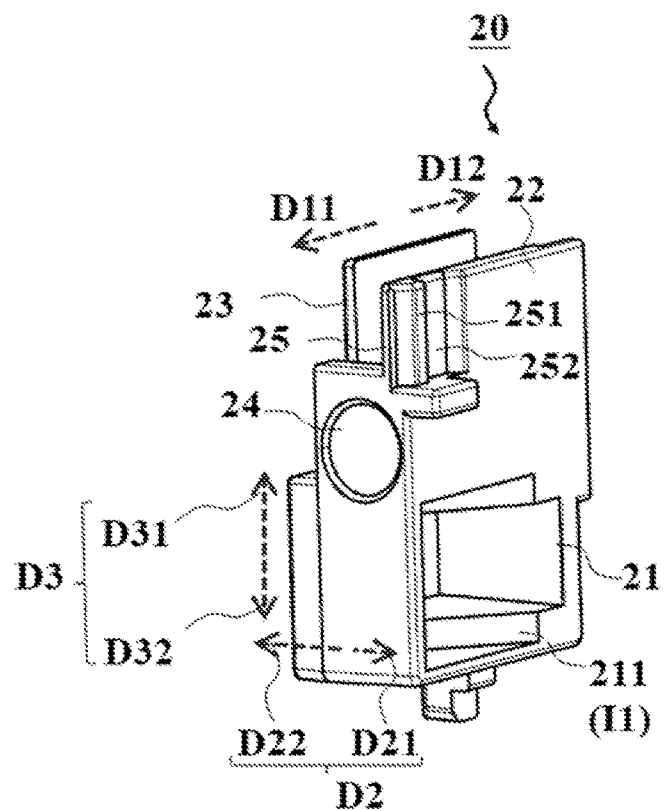

The slider 20 is used to slide in the lock 1 along a first axial direction D1 in a degree of freedom of one to drive other components to switch between the locking state and the unlocking state. Referring to FIG. 3A and FIG. 3B together, FIG. 3A and FIG. 3B are respectively schematic diagrams of the slider in different viewing angles according to the first embodiment of the lock of the invention.

Based on different functions, the slider 20 includes a pin hole 21, a first side plate 22, a second side plate 23, a first accommodating groove 24, a clamping and pulling structure 25, a ladder structure 26, a connecting groove 27, and a linkage surface 28 and a lock hook accommodating portion 29, etc. In the embodiment, the slider 20 is a single piece of material and is one piece formed, but the invention is not limited thereto, and the slider 20 may also be formed by combining multiple components.

For the sake of easy design description, it is assumed that a sliding direction of the slider 20 in the housing 130 is the first axial direction D1. During the locking process, a direction along which the slider 20 travels from an unlocking position to a locking position is a front side D11, otherwise, the direction is a back side D12. A second axial direction D2 and the first axial direction D1 are located on a same horizontal plane and perpendicular to each other. A third axial direction D3 is perpendicular to the first axial direction D1 and the second axial direction D2 at the same time.

The pin hole 21 is provided below the slider 20 and penetrates through the slider 20 along the second axial direction D2. The bottom of the pin hole 21 is provided with an inclined surface 211, and the inclined surface 211 obliquely faces the left front of the slider 20. The first side plate 22 and the second side plate 23 respectively extend from a side surface of a left side D21 and a side surface of a right side D22 of the slider 20 to an upper side D31, and the linkage surface 28 is provided there between. The linkage surface 28 extends horizontally for a short distance from the front side D11 to the back side D12, and then inclines toward a lower side D32 and gradually descends. A space among the first side plate 22, the second side plate 23 and the linkage surface 28 may be used as the lock hook accommodating portion 29 to accommodate the lock hook 60. The first accommodating groove 24 is recessed from a vertical end surface of the slider 20 on the front side D11 to the back side D12. The clamping and pulling structure 25 is located on a surface of the first side plate 22 facing the left side D21 and is an end surface at the front side D11. The clamping and pulling structure 25 includes a protruding rib 251 and a groove 252 adjacent to the protruding rib 251. The ladder structure 26 is located at an end surface of the second side plate 23 on the front side D11, and the ladder structure 26 includes a vertical surface 261. The connecting groove 27 is recessed from an end surface of the slider 20 on the back side D12 to the front side D11.

The rope 30 is used to wind the lock 1 and the bike connected to the lock 1 on a fixed object 2 to achieve a locking effect. Referring to FIG. 1A and FIG. 1B, one end of the rope 30 is connected to the lock rope turntable 140 in the lock body, and the other end is connected to the rope head 31. In the embodiment, the rope 30 may be optionally a steel rope. The rope head 31 is an integrally formed metal piece, which is provided with two locating rings parallel to each other, and a ring groove is provided between the two locating rings for hooking the lock hook 60.

However, the lock 1 is not limited to be configured with the rope 30. In another embodiment, when there is no need to use the rope 30 to wrap the fixed object 2, the lock 1 may optionally omit the rope 30, the retraction button 132, the lock rope turntable 140 and other related designs. In such design, the rope head 31 may be used as an independent component similar to a key for locking the lock 1. Furthermore, the rope head 31 may also be designed as another button disposed on the outside of the housing 130. When the button is pressed, the rope head 31 is pushed into the lock 1 for locking; and in case of unlocking, the rope head 31 pops out, but it is not detached from the housing 130.

The pin 40 is used to restrict actuation of the first connecting member 11 and the second connecting member 12. It may be seen from FIG. 2C that the pin 40 includes a base portion 41 and a head portion 42, and the head portion 42 is used to connect the first connecting member 11 and the second connecting member 12; and the right side D22 of the base portion 41 is provided with an inclined surface 411, where both of a slope and a direction of the inclined surface 411 correspond to that of the inclined surface 211 in the pin hole 21 of the slider 20. The base portion 41 is provided with a second accommodating groove 412 which is recessed from an end surface of the base portion 41 on the left side D21 to the right side D22. The base portion 41 and the head portion 42 may be different parts of a single component or two independent components. In the embodiment, the base portion 41 and the head portion 42 are two independent components combined with each other.

Figure 2A:
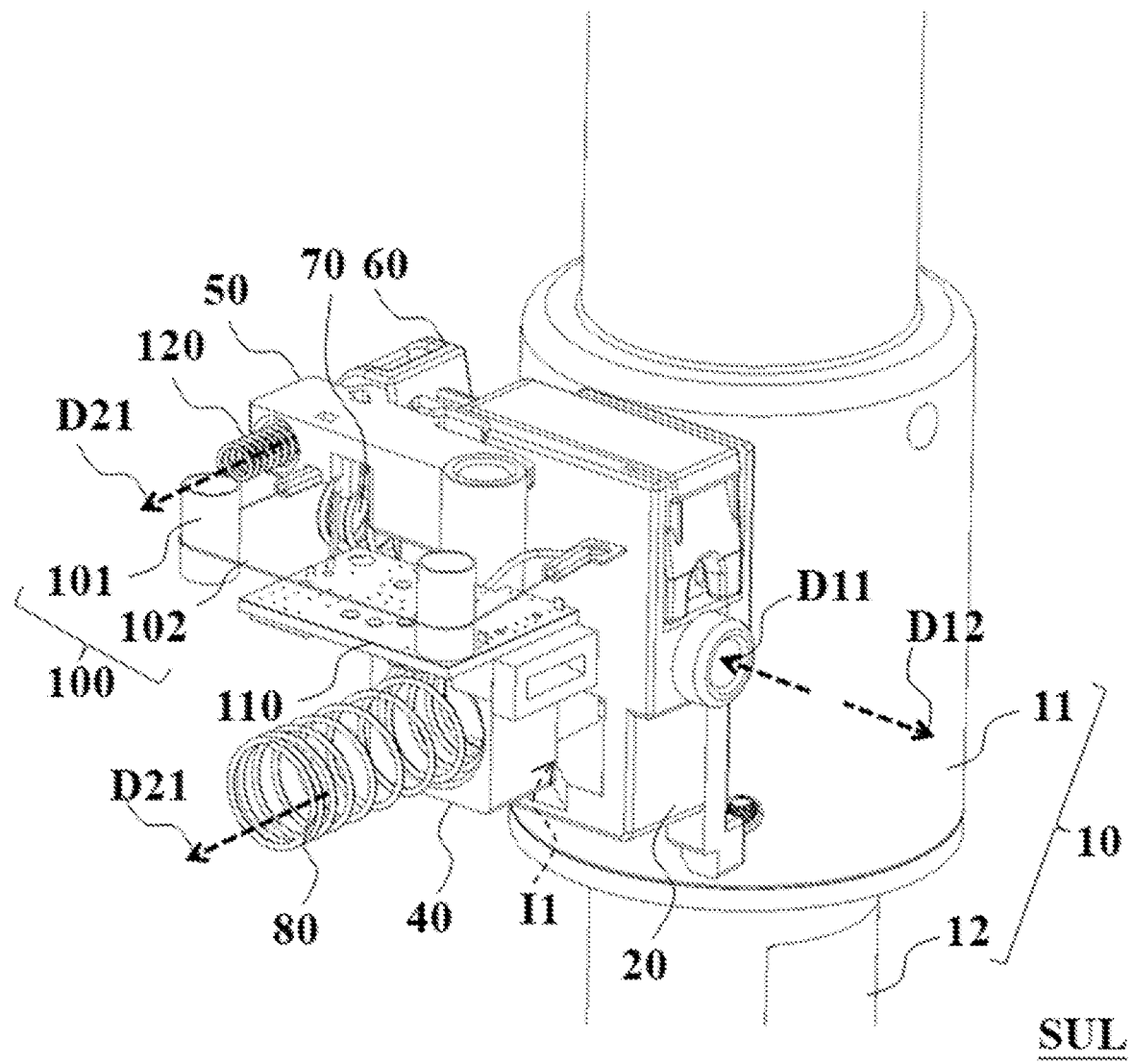
FIG. 2A and FIG. 2B are respectively schematic diagrams of main components inside a housing in different viewing angles under the unlocking state SUL according to the first embodiment of the lock of the invention.
Figure 2B:
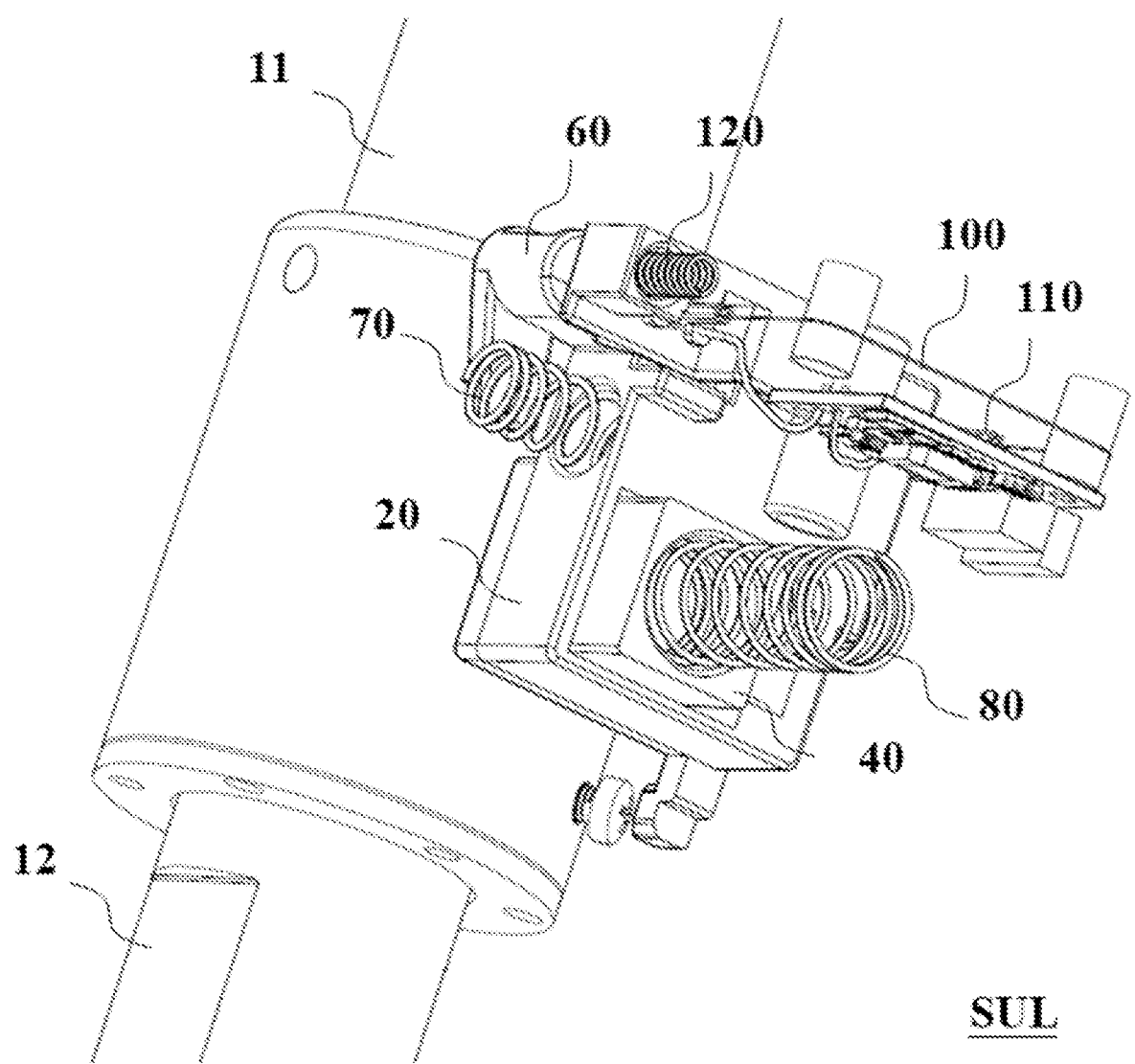
Figure 2C:
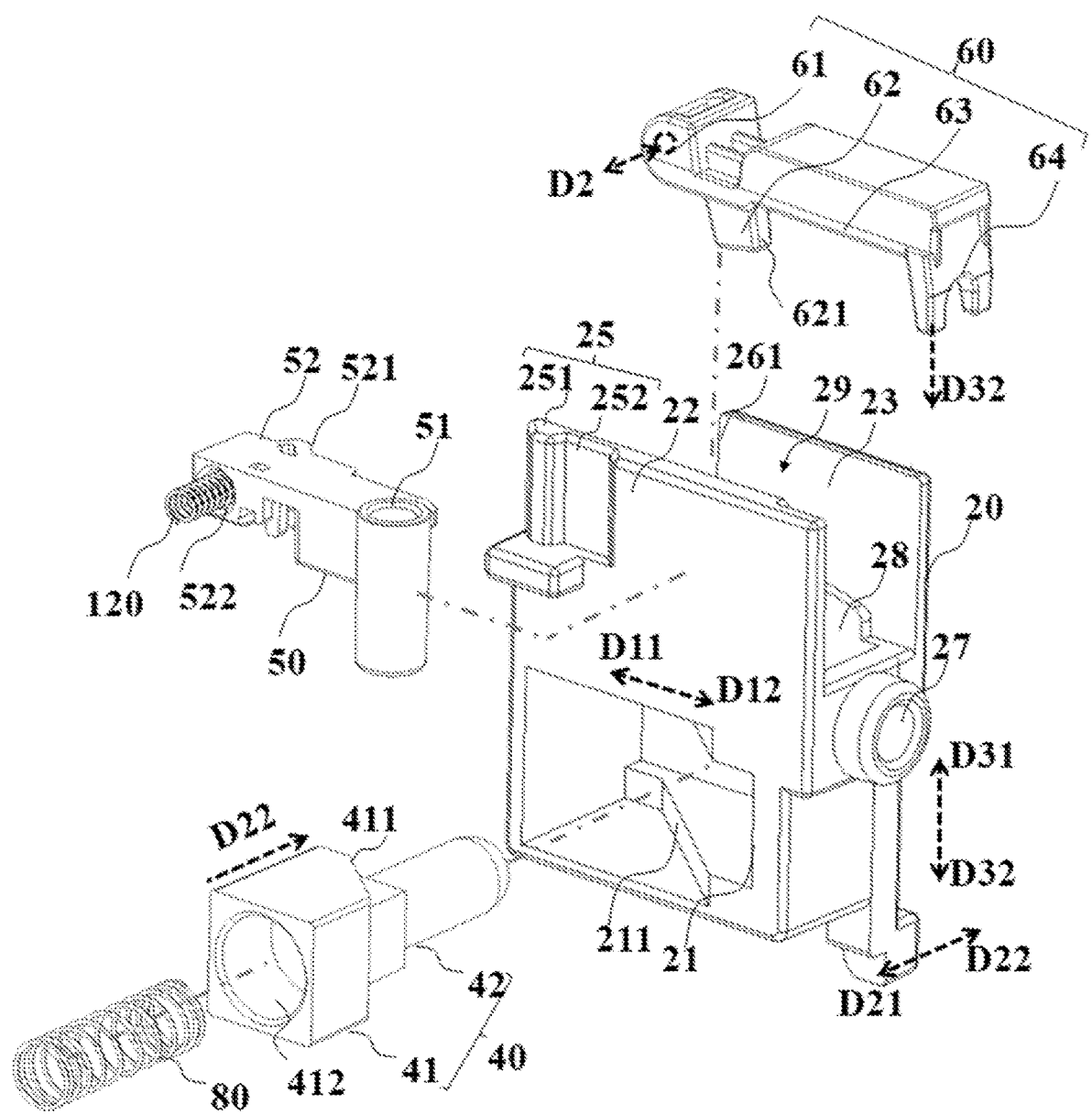
FIG. 2C is a schematic exploded view of a slider and peripheral components according to the first embodiment of the lock of the invention.

The fixing rod 50 is used to limit movement of the slider 20. Referring to FIG. 2C, it may be seen from the figure that the fixing rod 50 is provided with a rotation shaft 51 and a shifting lever 52. The rotating shaft 51 may rotate along the third axial direction D3 and is disposed on a base (not shown) in the housing 130, and the shifting lever 52 may rotate along the rotation shaft 51. An end of the shifting lever 52 on a side facing the right side D22 is provided with a protruding structure 521 corresponding to the shape of the clamping and pulling structure 25; and the side of the shifting lever 52 facing the left side D21 is provided with a third accommodating groove 522. The third accommodating groove 522 is recessed from an end surface of the shifting lever 52 on the left side D21 to the right side D22. In the embodiment, the rotation shaft 51 and the shifting lever 52 are one piece formed.

The lock hook 60 is used to limit movement of the rope head 31. Referring to FIG. 2C, a rotation shaft 61 and a head portion 62 are located at the front side D11 of the lock hook 60. The rotation shaft 61 is pivotally connected to an internal structure of the housing 130, so that the lock hook 60 may rotate along the second axial direction D2. The head portion 62 is provided with a vertical surface 621 facing the back side D12; and the lock hook 60 is provided with a barb 64 in a double-fork shape on the back side D12, and the double forks are connected by a semicircular structure; and the head portion 62 and the barb 64 are connected by an abdomen 63. In the embodiment, the rotation shaft 61, the head portion 62, the abdomen 63, and the barb 64 of the lock hook 60 are one piece formed. However, lock hook 60 may also be formed by combining multiple components, which is not limited by the invention.

The first driving component 70, the second driving component 80, and the third driving component 120 may respectively store and release mechanical energy or strain energy by compressing fluid therein or straining a material of the component, specifically, the component may be any one of or a combination of mechanical parts or devices such as a spring, a leaf spring, an air cylinder (for example, a compressor), etc. In the embodiment, the first driving component 70, the second driving component 80, and the third driving component 120 are respectively a spring, and sizes thereof respectively correspond to the first accommodating groove 24 of the slider 20, the second accommodating groove 412 of the pin 40 and the third accommodating groove 522 of the fixing rod 50.

The actuator 100 generally refers to a device that may convert electrical energy into mechanical kinetic energy. Referring to FIG. 2A to FIG. 2C, in the embodiment, the actuator 100 is a shape memory module, which includes a plurality of steering columns 101 and a shape memory alloy (SMA) wire 102. The SMA wire 102 is contracted when a temperature is increased to a reaction temperature range (for example, between 75 degrees and 300 degrees Celsius). By fixing one end of the SMA wire 102 and setting the other end on the fixing rod 50, the SMA wire 102 may pull the fixing rod 50 when it is contracted. The steering column 101 increases a length of the SMA wire 102 in a limited space, thereby increasing a total deformation amount thereof to meet a demand of a stroke. The actuator 100 may also use a motor in collaboration with various movement transmission components such as gears, worms, worm gears, connecting rods, etc., to achieve the effect of driving the fixing rod 50 to rotate. The shape memory module in the previous example has a simpler design, lower cost, less space occupation, longer service life, higher reliability, and better performance.

The control module 110 is used to verify an identification signal, and control an external component after the verification is passed. The control module 110 may be a microcontroller (MCU), a single chip, a control circuit, a programmable logic controller (PLC), or other electronic components that may achieve the aforementioned functions. In the embodiment, the control module 110 includes a circuit board and a microcontroller (MCU) connected to the circuit board.

The housing 130 is used to wrap and fix each component in the lock 1 and defines a lock body. Referring to FIG. 1C, the internal of the housing 130 is provided with a plurality of protruding ribs, protrusions, or lock holes that may limit moving directions of the aforementioned components, and details thereof are not repeated. In addition, the housing 130 may further include at least one base (chassis) (not shown), and the base is fixed inside the housing 130 and is used to connect and limit a location and a movement range of each of the components in the housing 130.

It should be noted that in the embodiment, during the locking process of the lock 1, no electricity is required at all, and the entire locking process is completed only through a force exerted on the rope head 31 by the user. The electric energy required by the actuator 100 and the control module 110 during the unlocking process may be directly obtained from the unlocking device via the connecting port 133. Namely, when the aforementioned design is adopted, the lock 1 may not include an electric storage component such as a battery, etc., thereby preventing the battery in the lock 1 from being damaged due to the open environment to result in malfunction, and further improving the reliability of the lock 1.

An operation mode of the lock 1 is described below.

Referring to FIG. 1B to FIG. 2B, before the locking process starts, the lock 1 is in the unlocking state SUL, at least a part of the aforementioned movement transmission component group 10, the slider 20, the rope 30, the pin 40, the fixing rod 50, the lock hook 60, the first driving component 70, the second driving component 80, the actuator 100, the control module 110, the third driving component 120 and the lock rope turntable 140 are all provided in the housing 130; the slider 20 is in the unlocking position; and the rope 30 is winded around the retractable lock rope turntable 140 at the lower part of the housing 130 of the lock 1, and only the rope head 31 is exposed from the housing 30.

When the locking process is started, the user first pulls out the rope head 31 and winds the rope 30 around the fixed object 2, and then inserts the rope head 31 into the lock hole 131 to connect with the connecting groove 27 located inside the lock hole 131; thereafter, the user pushes the rope head 31 to the locking position on the bottom of the lock 1, during which the slider 20 accordingly goes deep toward the locking position on the front side D11 along the first axial direction D1 from the unlocking position, and drives the peripheral components, and when the slider 20 is clamped by the fixing rod 50, the slider 20 reaches the locking position, and the lock 1 is in the locking state SL.

Figure 4A:
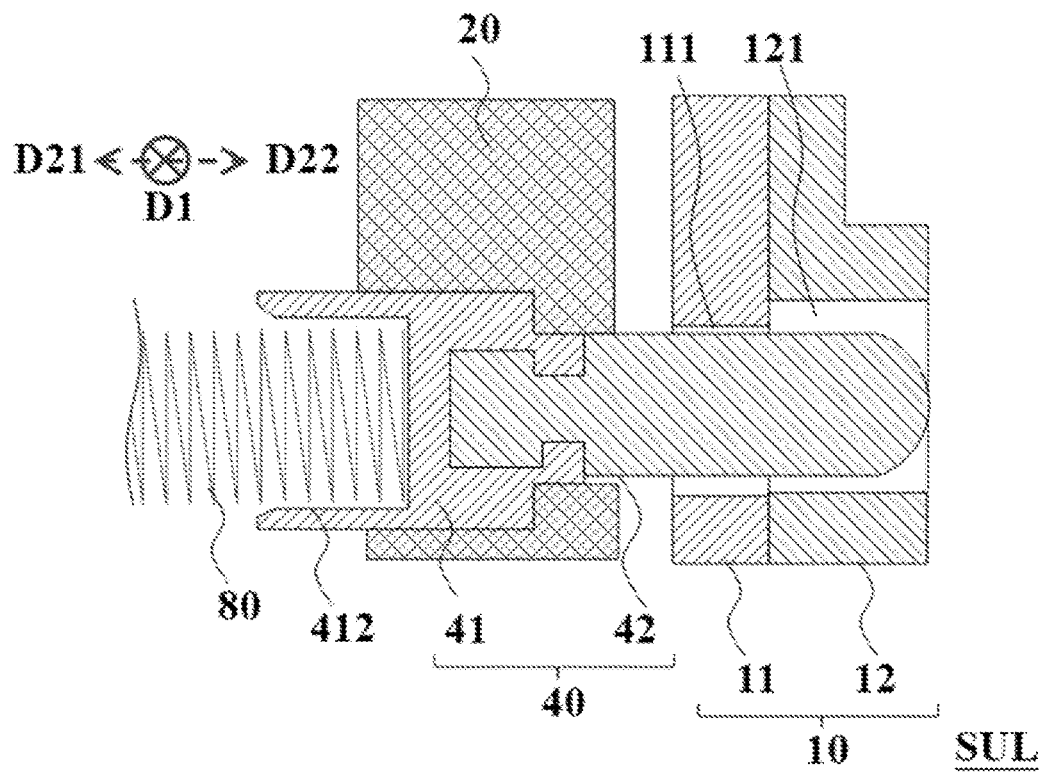
FIG. 4A and FIG. 4B are respectively schematic diagrams of a relative relationship between a pin and a movement transmission component group in the unlocking state SUL and a locking state SL according to the first embodiment of the lock of the invention.
Figure 4B:
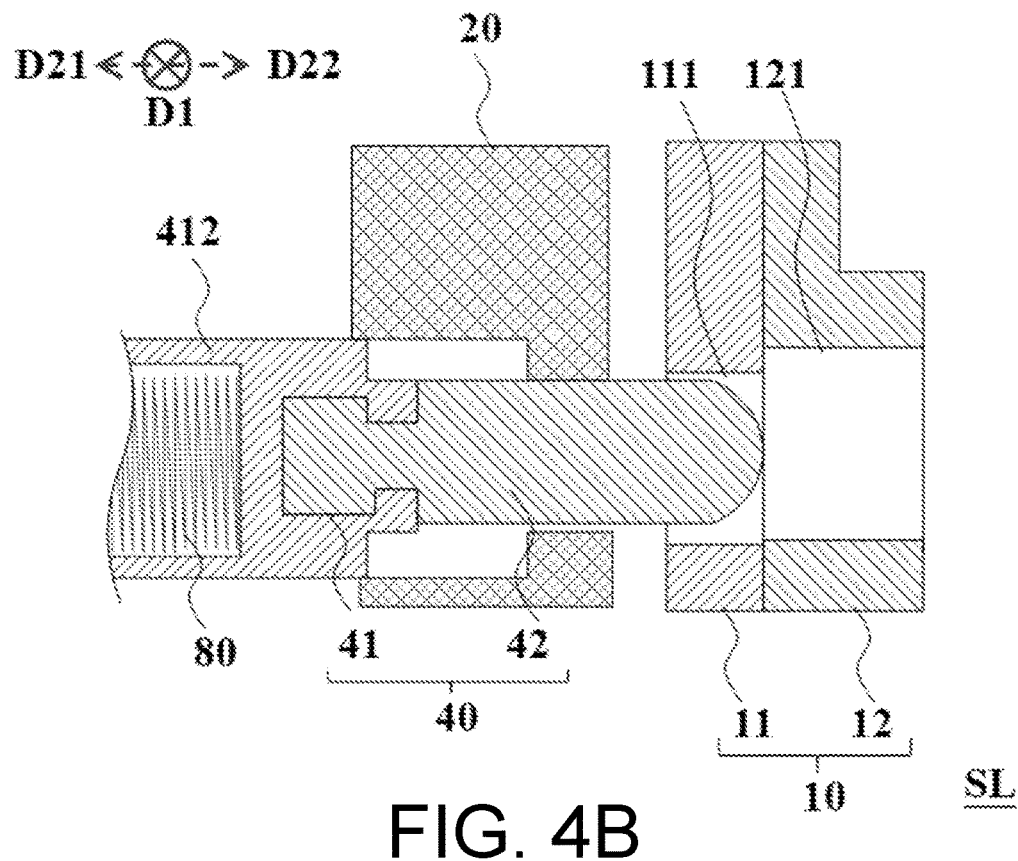

Referring to FIG. 4A and FIG. 4B, FIG. 4A and FIG. 4B are respectively schematic diagrams of a relative relationship between the pin 40 and the movement transmission component group 10 in the unlocking state SUL and the locking state SL according to the first embodiment of the lock 1 of the invention. It may be seen from FIG. 4A that when the lock 1 is in the unlocking state SUL, the slider 20 is in the unlocking position and the rope head 31 is not inserted into the lock 1. At the same time, the first connecting hole 111 of the first connecting member 11 and the second connecting hole 121 of the second connecting member 12 are arranged in a straight line, and the pin 40 penetrates through surfaces on the left and right sides of the slider 20 via the pin hole 21 to be simultaneously disposed through the first connecting hole 111 and the second connecting hole 121, so that the first connecting member 11 and the second connecting member 12 are linked to move with each other by the pin 40 and may rotate concentrically. At this moment, the inclined surface 211 of the slider 20 and the inclined surface 411 of the pin 40 are joined via an inclined interface I1, as shown in FIG. 2A. During the locking process of the slider 20, the pin 40 may move horizontally to the left side D21 along the second axial direction D2. The inclined surface 211 in the pin hole 21 may apply a pushing force to the inclined surface 411 of the pin 40 toward the left side D21 through the inclined interface I1, so as to drive the pin 40 to move toward the left side D21 to disengage from at least one of the first connecting member 11 and the second connecting member 12, as shown in FIG. 4B, namely, when the pin 40 only penetrates through the outer first connecting hole 111 but does not penetrate through the second connecting hole 121, the first connecting member 11 and the second connecting member 12 are not linked to move with each other. On the other hand, when the pin 40 moves to the left side D21, the second driving component 80 is accordingly compressed by the pin 40.

Figure 5A:
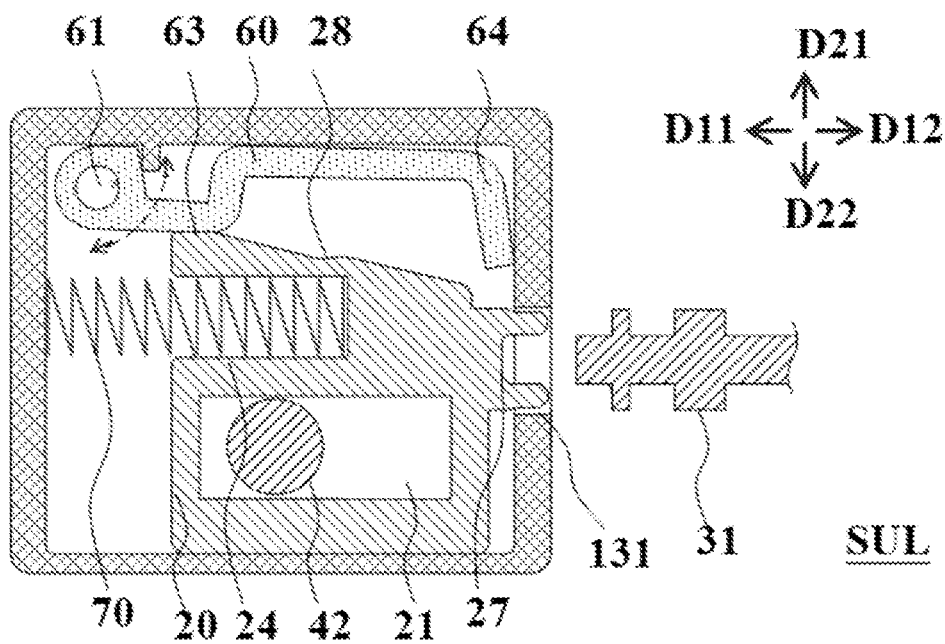
FIGS. 5A and 5B are respectively schematic diagrams of a relative relationship between the slider and a lock hook in the unlocking state SUL and the locking state SL according to the first embodiment of the lock of the invention.
Figure 5B:
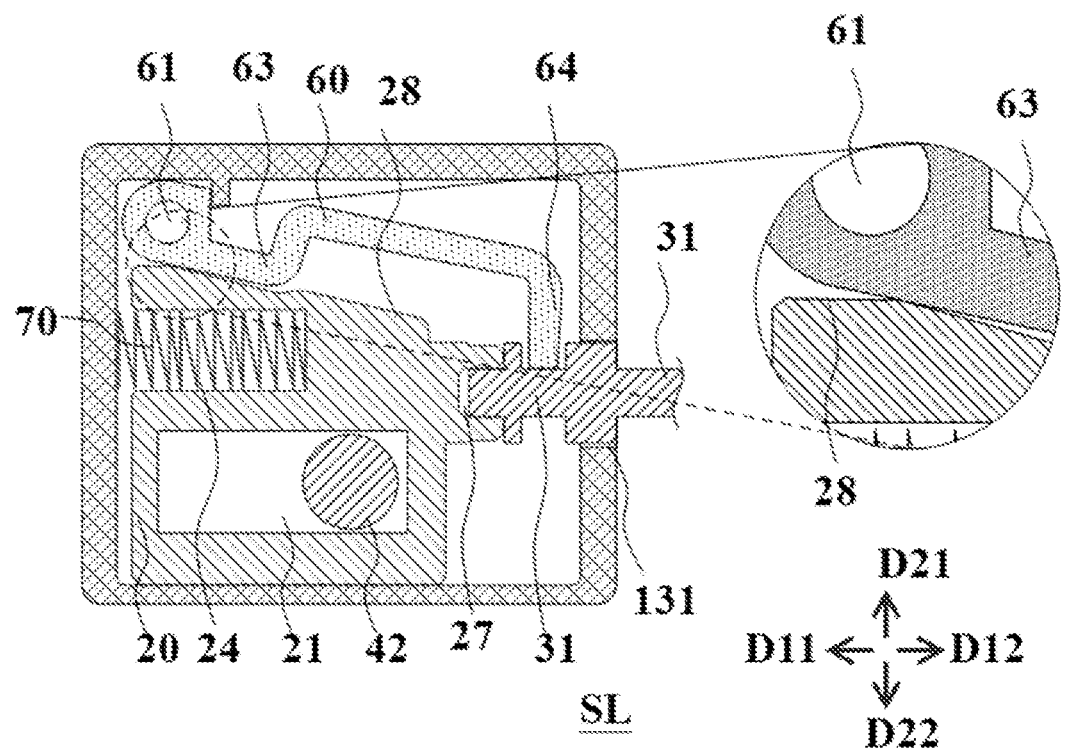

On the other hand, referring to FIG. 2A, FIG. 5A and FIG. 5B, FIGS. 5A and 5B are respectively schematic diagrams of a relative relationship between the slider and the lock hook in the unlocking state SUL and the locking state SL according to the first embodiment of the lock 1 of the invention. It may be seen from FIG. 2A that when the lock 1 is in the unlocking state SUL, most of the lock hook 60 is disposed in the lock hook accommodating portion 29. In addition, as shown in FIG. 2C and FIG. 5A, in the unlocking state SUL, the abdomen 63 of the lock hook 60 is supported by the linkage surface 28 of the slider 20, and the barb 64 is in a suspended state. When the slider 20 moves toward the locking position to the front side D11, the vertical surface 261 of the ladder structure 26 may push the vertical surface 621 on the head portion 62 of the lock hook 60, and the lock hook 60 rotates along the second axial direction D2 while taking the rotation shaft 61 as a fulcrum, so that the barb 64 provided at the other end of the rotation shaft 61 moves toward the lower side D32 to buckle the rope head 31 to limit the movement of the rope head 31 and prevent the rope head 31 from moving toward the back side D12 to the unlocking position. The aforementioned barb 64 of the lock hook 60 is driven by the slider 20 to buckle the rope head 31 to limit the movement of the rope head 31, which means that the barb 64 of the lock hook 60 is buckled to the ring groove of the two locating rings on the rope head 31, and the barb 64 is interfered with the front and rear locating rings, so that the rope head 31 cannot get rid of the lock hook 60. However, the rope head 31 may still slightly move along the first axial direction D1 between the two locating rings. When the slider 20 reaches the locking position, the lock 1 is in the locking state SL, and the relationship between the components is shown in FIG. 5B.

Figure 6A:
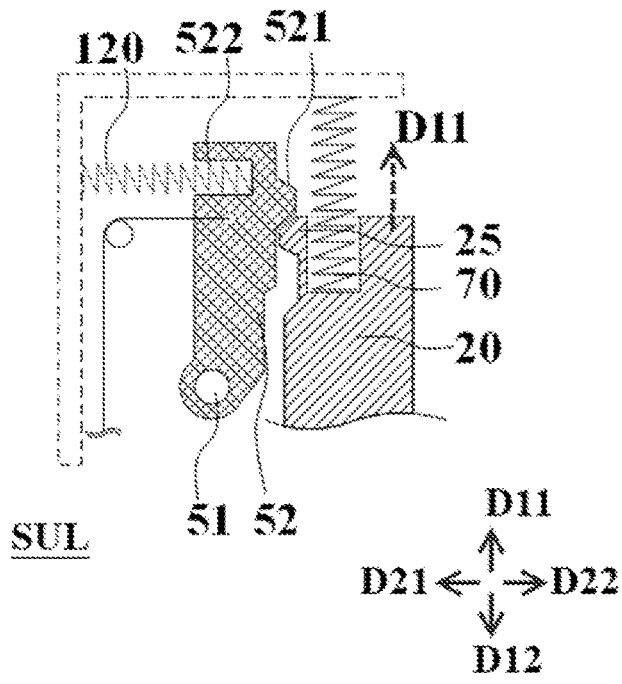
FIG. 6A to FIG. 6D are respectively schematic diagrams of relative positions of the slider and a fixing rod at different time points according to the first embodiment of the lock of the invention.
Figure 6B:
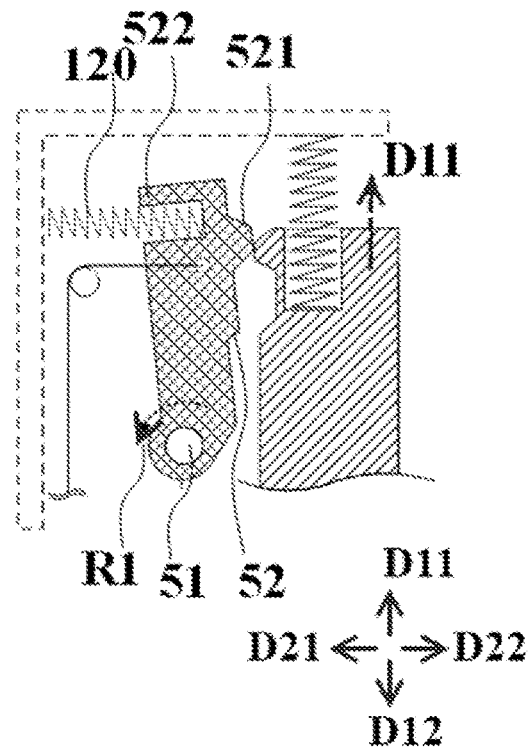
Figure 6C:
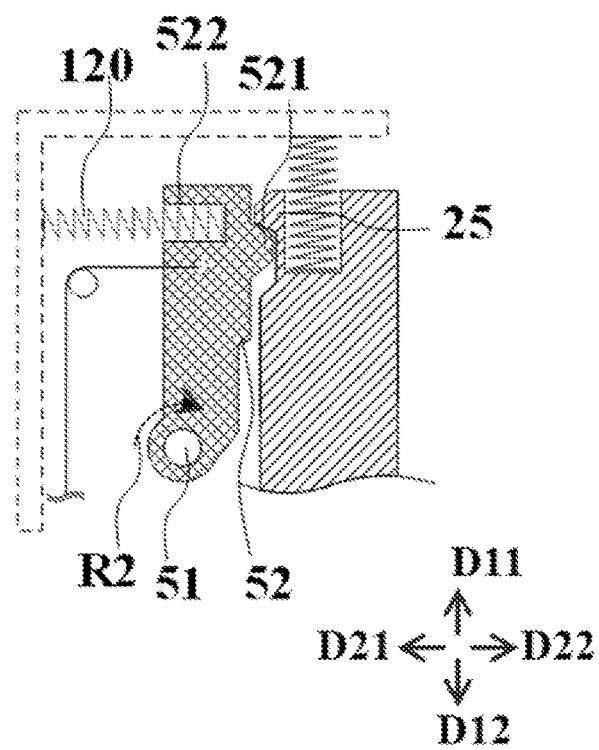

On the other hand, referring to FIG. 2C and FIG. 6A to FIG. 6D, FIG. 6A to FIG. 6D are respectively schematic diagrams of relative positions of the slider 20 and the fixing rod 50 at different time points according to the first embodiment of the lock 1 of the invention. It may be seen from FIG. 6A that when the lock 1 is in the unlocking state SUL, the third driving component 120 disposed in the third accommodating groove 522 of the shifting lever 52 exerts a pushing force on the shifting lever 52 toward the right side D22 to make the shifting lever 52 in a closed state. When the slider 20 moves toward the locking position to the front side D11, the clamping and pulling structure 25 of the slider 20 applies a force to the shifting lever 52 toward the left side D21 to drive the shifting lever 52 to rotate outward R1 along the rotation shaft 51 in the third axial direction D3 to allow the slider 20 to pass, as shown in FIG. 6B. During such period, the third driving component 120 (a spring) may be compressed, and after the slider 20 passes, the shifting lever 52 may be forced by the third driving component 120 to automatically rotate inward R2 along the rotation shaft 51 to engage the slider 20 at the locking position to prevent the slider 20 from moving toward the unlocking position to the back side D12, as shown in FIG. 6C.

In this way, when the lock 1 is in the locking state SL, except that the ring groove of the rope head 31 is locked by the lock hook 60 and cannot be withdrawn from the lock 1, the first connecting member 11 and the second connecting member 12 are not linked to move to each other by the pin 40, and the user cannot control the front wheel through the handlebar. Referring to FIG. 5B, in case that the rope 30 is forcibly drawn out of the lock 1 as the lock is in the locking state SL, since the rope head 31 and the slider 20 are independent components and there is no fixing means there between, so that even if the rope head 31 is damaged and drawn out of the lock 1, the slider 20 may not be affected. On the contrary, as shown in FIG. 6C, the slider 20 is still maintained in the locking position by the fixing rod 50, so that the handlebar and the front wheel of the bike are ensured to be maintained to a non-linked state. Namely, through the arrangement of the slider 20, the problem that the locking state is released when the rope head 31 is forcibly pulled out in the prior art may be avoided. In addition, since a non-linkage design rather than an interference locking design is adopted, the lock 1 of the invention also resolves the problem of bike damage caused by forcibly riding under the locking state.

Figure 6D:
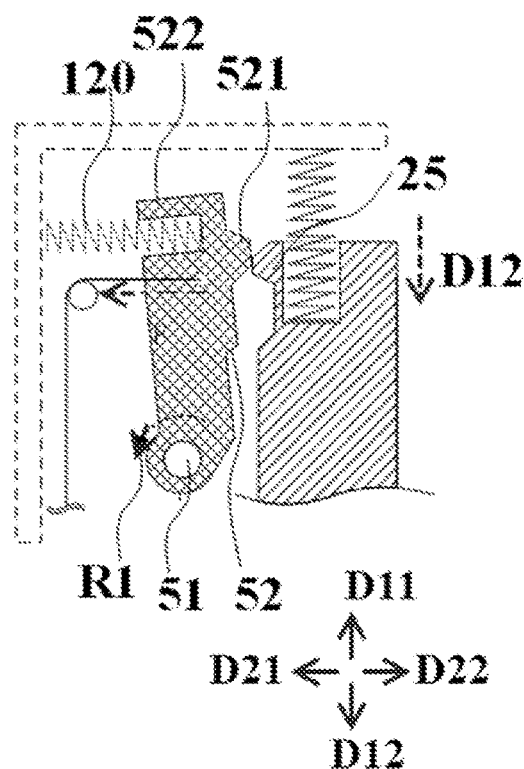

When the unlocking process starts, the user connects the unlocking device to the lock 1 through the connecting port 133 so that the unlocking device may supply power to the lock 1. The control module 110 in the lock 1 may obtain power from the connecting port 133 and execute a verification procedure to verify the unlocking device. In the verification procedure, the unlocking device transmits an identification signal to the control module 110 via the connecting port 133, and the control module 110 verifies whether the identification signal is consistent with a predetermined identification code in the lock 1, and if yes, it is determined that the unlocking device passes the verification. Or, in the verification procedure, it may be changed to that the control module 110 transmits the identification signal to the unlocking device for verification, and a verification success signal is transmitted back when the unlocking device is successfully verified, and the control module determines that the unlocking device passes the verification based on the verification success signal. However, the aforementioned verification procedure is only used for description, and the invention is not limited thereto. After the unlocking device passes the verification, the control module 110 controls the actuator 100 to start and powers the actuator 100, so that the SMA wire 102 therein is heated due to its internal resistance until the temperature reaches a reaction temperature range (for example, 75 to 200 degrees Celsius), SMA wire 102 is contracted to apply an external force to the left side D21 on the shifting lever 52. The aforementioned external force is slightly greater than the external force applied to the shifting lever 52 toward the right side D22 by the third driving component 120, so that the shifting lever 52 may be rotated outward R1 along the rotation shaft 51 to pull it apart and release the slider 20, and a result thereof is shown in FIG. 6D.

To release the slider 20 from the locking position may release the strain energy of the first driving component 70 originally compressed by the slider 20 to push the slider 20 from the locking position toward the back side D12 to the unlocking position. Referring to FIG. 5B, it may be seen from the figure that when the slider 20 is moved toward the back side D12 to the unlocking position, the abdomen 63 of the lock hook 60 may be pushed and lifted up by a turning part of the linkage surface 28 of the slider 20, so that the lock hook 60 is rotated in an opposite direction along the second axial direction D2, and the barb 64 is disengaged from the rope head 31, thereby allowing the slider 20 to move the rope head 31 toward the back side D12 and push the same out of the housing 130 when the slider 20 moves toward the back side D12 to the unlocking position. When the slider 20 reaches the unlocking position, a relative relationship between the lock hook 60 and the slider 20 is shown in FIG. 5A. In the embodiment, during the unlocking process, the lock hook 60 is not restored by a spring but is driven by the slider 20, which prevents a situation that the lock hook 60 is mistakenly detached from the rope head 31 due to spring deformation occurred when the traditional lock is struck, and further improve the reliability of the lock 1.

In addition, referring to FIG. 2A, when the slider 20 is moved toward the back side D12 to the unlocking position, the pin 40 is pushed by the second driving component 80 and reinserted into the first connecting hole 111 of the first connecting member 11 and the second connecting hole 121 of the second connecting member 12 for connecting the two members, such that the handlebar and the front wheel of the bike may be linked to move to each other again; and when the lock 1 is in the unlocking state SUL, the state of the pin 40 is as shown in FIG. 4A. Meanwhile, the rope head 31 is released from the housing 130. At this time, the user may press the retraction button 132 on the housing 130, and the lock 1 may retract the rope 30 into the lock 1, and the user may ride the bike normally.

Finally, it is emphasized that an equal scope of the lock of the invention includes but is not limited to the examples of implementation, and the constituent components and steps disclosed in the previous embodiments of the invention are only examples and are not used to limit the scope of the invention. The substitution or change of other equivalent components and steps shall also be covered by the scope of patent application of the invention.

What is claimed is:

1. A lock, comprising:
   a movement transmission component group, comprising a first connecting member and a second connecting member;
   a slider;
   a rope head, linked to move with the slider, and configured to trigger a locking motion;
   a pin, linked to move with the slider, and configured to limit movement of the first connecting member or the second connecting member;
   a fixing rod, linked to move with the slider, and configured to limit movement of the slider;
   a lock hook, linked to move with the slider, and configured to limit movement of the rope head; and
   a first driving component, linked to move with the slider, and configured to push the slider to move,
   wherein, during a locking process of the lock,
   the rope head pushes the slider from an unlocking position to a locking position;
   the lock hook is driven by the slider to hook the rope head to limit movement of the rope head;
   the slider and the fixing rod are engaged at the locking position to prevent the slider from moving to the unlocking position; and
   the pin is driven by the slider to separate from at least one of the first connecting member and the second connecting member;
   wherein: during an unlocking process of the lock,
   the fixing rod releases the slider so that the first driving component pushes the slider from the locking position to the unlocking position;
   the lock hook is pushed by the slider to make the lock hook separated from the rope head, so that the rope head is adapted to move; and
   the pin reconnects at least one of the first connecting member and the second connecting member.

2. The lock as claimed in claim 1, wherein the slider and the pin are connected by an inclined interface, and when the slider is moved toward the locking position, the slider drives the pin through the inclined interface to make the pin separate from at least one of the first connecting member and the second connecting member.

3. The lock as claimed in claim 2, further comprising a second driving component linked to move with the pin, wherein the second driving component is configured to drive the pin during the unlocking process to connect the pin with at least one of the first connecting member and the second connecting member.

4. The lock as claimed in claim 3, wherein the slider is provided with a pin hole, the inclined interface is located in the pin hole, and the pin hole is configured to allow the pin to penetrate through the slider to connect with at least one of the first connecting member and the second connecting member.

5. The lock as claimed in claim 4, wherein during the locking process and the unlocking process, the pin moves back and forth along a horizontal direction, and the horizontal direction is perpendicular to a moving direction of the slider.

6. The lock as claimed in claim 1, wherein: the fixing rod is provided with a rotation shaft and a shifting lever, the rotation shaft is linked to move with the shifting lever, and during the locking process, the slider drives the shifting lever to rotate outward along the rotation shaft to allow the slider to pass through; after the slider passes through, the shifting lever automatically rotates inward along the rotation shaft and is engaged with the slider at the locking position to prevent the slider from moving to the unlocking position; and during the unlocking process, the shifting lever is rotated outward along the rotation shaft by an external force to release the slider.

7. The lock as claimed in claim 6, further comprising:
a connecting port, configured to connect with an unlocking device;
an actuator, linked to move with the shifting lever; and
a control module, connected to the connecting port and the actuator, configured to perform a verification procedure during the unlocking process to verify the unlocking device, wherein when the unlocking device passes a verification, the control module controls the actuator to apply the external force to the shifting lever, so that the shifting lever is rotated outward along the rotation shaft to release the slider.

8. The lock as claimed in claim 7, further comprising:
a third driving component, linked to move with the shifting lever, wherein the third driving component is configured to rotate the shifting lever inward automatically along the rotation shaft and engage the slider at the locking position during the locking process, so as to prevent the slider from moving to the unlocking position;

wherein the actuator comprises a shape memory alloy wire, which is contracted when a temperature is raised to a reaction temperature range to generate the external force, and is configured to pull the shifting lever to rotate outward along the rotation shaft to release the slider during the unlocking process.

9. The lock as claimed in claim 8, further comprising a second driving component linked to move with the pin, wherein the second driving component is configured to drive the pin during the unlocking process to connect the pin with at least one of the first connecting member and the second connecting member, wherein the first driving component, the second driving component, and the third driving component are a spring, a leaf spring, or an air cylinder.

10. The lock as claimed in claim 7, wherein the lock does not comprise a battery, and electric energy needed by the actuator and the control module in the unlocking process is obtained through the connecting port.

11. The lock as claimed in claim 1, wherein: one of the first connecting member and the second connecting member is an upper-rotation shaft, the other one is a lower-rotation shaft, the first connecting member and the second connecting member are coaxially arranged and respectively have a connecting hole, the connecting hole of the first connecting member and the connecting hole of the second connecting member are respectively adapted to accommodate the pin, and when the pin simultaneously penetrate into the connecting hole of the first connecting member and the connecting hole of the second connecting member, the first connecting member and the second connecting member are linked to move with each other; and when the pin does not simultaneously penetrate into the connecting hole of the first connecting member and the connecting hole of the second connecting member, the first connecting member and the second connecting member are not linked to move with each other.

12. The lock as claimed in claim 1, further comprising a rope, wherein one end of the rope is connected with a lock body, and the other end is connected with the rope head, and when the rope head is at the locking position, the rope is adapted to be winded around a fixed object to achieve a locking effect.

* * * * *